R. Rice,
Balance Wheel,
№ 68,530. Patented Sept. 3, 1867.
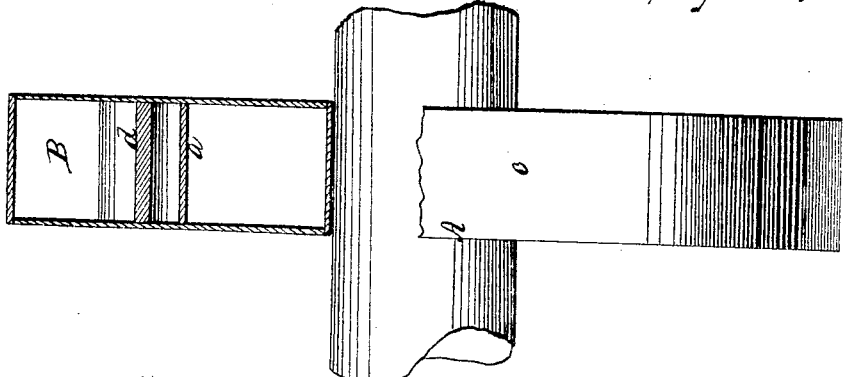
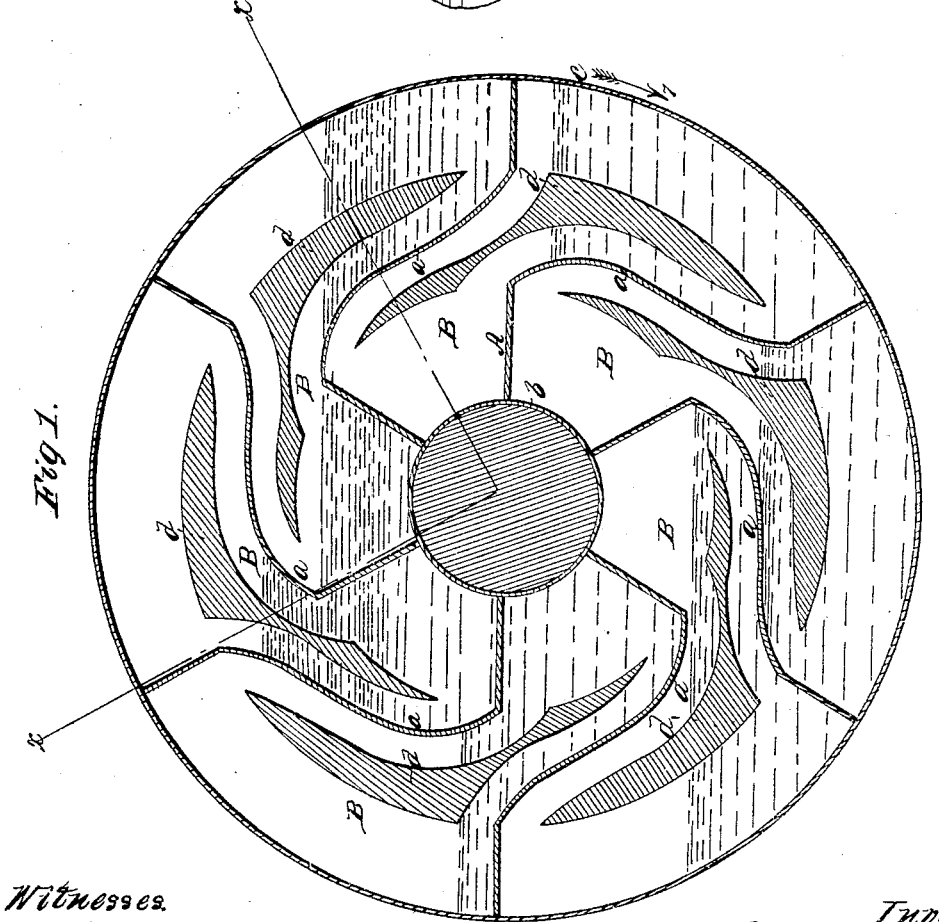
Witnesses.
Inventor.

United States Patent Office.

ROBBERT RICE, OF MINERAL, ILLINOIS.

Letters Patent No. 68,530, dated September 3, 1867.

---

IMPROVEMENT IN FLY OR BALANCE-WHEEL.

---

The Schedule referred to in these Letters Patent and making part of the same.

---

TO ALL WHOM IT MAY CONCERN:

Be it known that I, ROBBERT RICE, of Mineral, in the county of Bureau, and State of Illinois, have invented a new and improved Fly or Balance-Wheel; and I do hereby declare that the following is a full, clear, and exact description thereof, which will enable those skilled in the art to make and use the same, reference being had to the accompanying drawings, forming part of this specification, in which—

Figure 1 is a side view of my invention, the plate or side of the wheel nearest the eye being removed in order to show the interior.

Figure 2, a section of the same taken in the line $x$ $x$, fig. 1.

Similar letters of reference indicate corresponding parts.

This invention consists in constructing a fly or balance-wheel, with a series of internal chambers, arranged in such a manner that by partially filling said chambers with water or other suitable fluid the gravity of the latter will be rendered subservient as an assistant motor or an economizer of power.

A represents a fly or balance-wheel, which is hollow, and provided with partitions $a$, which divide the wheel into a series of compartments, B, of peculiar form, as shown clearly in fig. 1, the partitions $a$ extending from the hub $b$ of the wheel to its rim $c$, in a sinuous manner. In each compartment B there is a fixed plate, $d$. These plates are placed longitudinally in the compartments, a space or opening being allowed at each end, as shown in fig. 1.

This fly or balance-wheel is placed or keyed on a shaft, as usual, and the compartments B are partially supplied with water, (about half filled,) and it will be seen by referring to fig. 1 that the water in the right-hand compartments B will have their water in the lower parts of the same, and near the periphery of the wheel, while those at the left-hand side have their water near the shaft. This result is owing to the peculiar shape or form of the compartments B, and it will further be seen that owing to the water assuming the position in the compartments as specified, the wheel will exert an influence as a motor when rotating in the direction indicated by arrow 1. The plates $d$ serve as breaks or guards to prevent the water being thrown outward in the left-hand compartments under centrifugal force.

Having thus described my invention, what I claim as new, and desire to secure by Letters Patent, is—

A fly or balance-wheel, provided internally with compartments, of the form substantially as shown, and partially filled with water or other suitable fluid, to operate in the manner and for the purpose set forth.

ROBBERT RICE.

Witnesses:
SAMUEL LEWIS,
JAMES ROSS.